July 12, 1960
R. D. FAGGE
2,944,525
FIXTURE-MOUNTED SPOT WELDING GUN
Filed Jan. 25, 1957
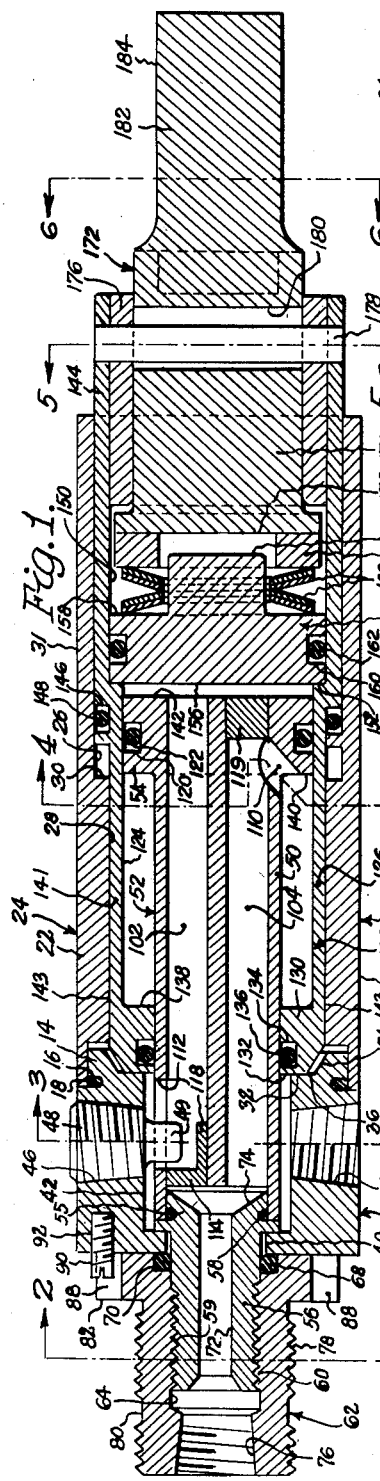
INVENTOR.
Ralph D. Fagge
BY Barthel + Bugbee
Attys

# United States Patent Office 2,944,525
Patented July 12, 1960

2,944,525
FIXTURE-MOUNTED SPOT WELDING GUN

Ralph D. Fagge, Detroit, Mich.; Sophie A. Fagge, administratrix of said Ralph D. Fagge, deceased Filed Jan. 25, 1957, Ser. No. 636,350

1 Claim. (Cl. 121—38)

This invention relates to spot welding guns and, in particular, to so-called fixture-mounted spot welding guns.

Hitherto, the attachment of sheet metal parts to one another by spot welding has frequently been accomplished by means of fixtures adapted to receive the parts to be welded together and hold these parts in their proper positions prior to welding, spot welding guns being mounted at closely-spaced intervals on the fixture to accomplish the welding of the parts to one another. Each such fixture-mounted spot welding gun carries aligned fixed and movable welding electrodes spaced axially apart from one another and a piston and cylinder is provided for moving one of these electrodes rapidly into and out of engagement with the workpiece to force it and its companion workpiece against the opposite electrode and hold these workpieces together with a powerful squeezing and compressing force while the electric current is passed between the electrodes and through the workpieces to bring about the weld.

In previous welding fixtures provided with such fixture-mounted welding guns, the diameters of the single-stage hydraulic or compressed air cylinders used for reciprocating the movable electrodes have been unavoidably large so as to interfere with the mounting of such pistons and cylinders closely adjoining one another. On the other hand, the use of small diameter pistons and cylinders for this purpose requires excessively high pressures of the compressed air or hydraulic pressure fluid used in propelling the pistons, with a consequent danger to the operators and adjoining apparatus. At the same time, it is necessary for these pistons to have sufficiently long strokes to enable free insertion and removal of the work before and after welding respectively, especially where the work is automatically positioned by conveyors or other automation machinery.

In my co-pending application Serial No. 625,969, filed December 3, 1956, for Non-Rotating Multiple-Piston Cylinder for Fixture-Mounted Spot Welding Gun, I have disclosed and claimed a multiple-piston gun with a long-stroke electrode holder arranged for heavy duty welding at high clamping pressures, yet with an exceptionally small overall diameter.

Accordingly, one object of the present invention is to provide a fixture-mounted spot welding gun of comparatively small diameter of medium length of stroke for ordinary welding set-ups requiring a moderate application of pressure of the electrodes against the workpiece parts to be welded, thereby enabling mounting adjacent welding guns closer to one another than is ordinarily possible for the pressure which these guns are capable of exerting upon the workpieces.

Another object is to provide a fixture-mounted spot welding gun of the foregoing character wherein a unusually large piston area is provided with a comparatively small overall diameter of cylinder by employing external and internal tubular pistons which are movable relatively to one another.

Another object is to provide a fixture-mounted spot welding gun of the foregoing character wherein two tubular pistons are mounted in tandem within the cylinder for reciprocation relatively to one another and also relatively to a stationary piston mounted inside both tubular pistons and serving as an abutment piston as well as for conducting pressure fluid to and from the piston areas on the movable tubular piston.

Other objects and advantages of the invention will become apparent during the course of the following description of the accompanying drawings, wherein:

Figure 1 is a central longitudinal vertical section through a fixture-mounted spot welding gun with tandem movable tubular pistons and a stationary abutment piston, according to one form of the invention, for use with hydraulic fluid as the motive fluid;

Figure 2 is a left-hand end elevation of the welding gun shown in Figure 1;

Figure 3 is a cross-section taken along the line 3—3 in Figure 1, showing the means for supplying pressure fluid to the cylinders and for preventing rotation of the stationary abutment piston;

Figure 4 is a cross-section taken along the line 4—4 in Figure 1, showing the means for preventing rotation of the tubular movable outer piston relatively to the cylinder;

Figure 5 is a cross-section taken along the line 5—5 in Figure 1, showing details of the coupling pin and lost-motion connection between the outer and inner tubular pistons;

Figure 6 is a cross-section mainly in end elevation, through the electrode holder taken along the line 6—6 in Figure 1;

Figure 7 is a view approximately in side elevation of the inner end portion of the stationary abutment piston rod looking in the direction of the slightly-inclined arrow 7 in Figure 3; and Figure 8 is a perspective view of a closure plug used in the piston rod of the stationary abutment piston of Figures 1 and 3.

Referring to the drawings in detail, Figure 1 shows a fixture-mounted spot welding gun, generally designated 10, according to one form of the invention as adapted to use an elastic motive fluid, such as hydraulic fluid, and also adapted to be mounted with other similar guns in closely-spaced side-by-side relationship upon a welding fixture (not shown) for receiving and holding sheet metal parts while they are being welded to one another. Workpieces of this type are used, for example, in automobile bodies, railway car bodies, sheet metal containers or tanks, agricultural machinery, pre-fabricated buildings, and aircraft, etc.

The welding gun 10 at its inner end has a cylinder head, generally designated 12, flanged and grooved as at 14 and 16 respectively to receive a ring 18 of metal abrasion wire which, when heated, secures thereto an outer cylinder barrel 22, the assembly of the cylinder head 12 and cylinder barrel 22 together forming an outer cylinder, generally designated 24. The cylinder barrel 22 has a generally cylindrical bore 26, the rearward portion of which, however, has flat parallel guide surfaces 28 (Figure 4) terminating at shoulders 30 where the flat guide surfaces 28 join the cylinder bore 26. This arrangement prevents rotation of the piston relatively to the cylinder barrel 22 as is explained more fully below. The cylinder barrel 22 in Figure 1 is shown as being of one-piece construction from end to end, whereas in practice it consists of a rearward half 29 carrying the flat guide surfaces 28 and a forward half 31 welded thereto at a plane passing through the shoulders 30.

Inside the flange 14 the cylinder head 12 is provided with an inner end abutment surface 32 which is partly internally-tapered as at 34 and partly radial as at 36, the latter serving as an abutment surface, as explained below. The cylinder head 12 is provided with stepped bores 40 and 42 of increasing diameters, the bore 42 having diametrically-opposed radial threaded ports 44 and 46 communicating therewith. The service port 44 is adapted to receive a service pipe coupling (not shown) for connection to a service pipe conveying fluid to and from the welding gun 10, whereas the port 46 carries a threaded stop plug 48 with an unthreaded nose 49 of smaller diameter projecting radially inward therefrom.

Mounted within the bore 42 but spaced radially inward therefrom is a hollow stem 50 of a stationary abutment piston, generally designated 52, with an abutment head 54. The rearward or inner end of the stem 50 is brazed or otherwise secured to the flanged annularly-grooved end portion 55 of a threaded hollow tube 56 by means of a brazing ring 58. The tube 56 is threaded as at 59 to be received within a correspondingly internally-threaded counterbore 60 in a flanged tubular support, generally designated 62. The latter has an axial bore 64 adjacent the end of the counterbore 60, and adjacent its inner end is provided with a conventional O-ring 68 received within an annular recess 70. The tube 56 has a longitudinal bore 72 therein terminating at its forward end in a flared portion 74, whereas the support 62 at the outer end of the bore 64 terminates in a threaded service port 76. The latter is also adapted to receive a threaded pipe coupling (not shown) for a service pipe for compressed air or other motive fluid in a manner similar to that described above in connection with the service port 44.

The flanged tubular support 62 is threaded externally as at 78, the thread being interrupted by an annular groove 80 near its outer end. The flange 82 of the support 62 (Figure 2) is made of hexagonal outline with sides 86 carrying central notches 88 of U-shaped cross-section, one of which is adapted to receive a headless set screw 90 threaded into a threaded hole 92 parallel to the axis of the cylinder 24 within the cylinder head 12. The hollow stem 50 is provided with three parallel longitudinal bores or passageways 100, 102 and 104 respectively. The passageways 100 and 102 lead through the abutment head 54 to the forward side thereof, whereas an inclined passageway 110 leads from the passageway 104 to the rearward side of the abutment head 54. It will be evident from this construction that the twin forward fluid passageways 100 and 102 will conduct a much greater amount of pressure fluid in less time and with less resistance than the single forward fluid passageway hitherto provided in prior hydraulic piston and cylinder units.

The passageways 100, 102 at their rearward ends communicate with a pair of elongated slots 108 and 112 (Figure 7). The lower slot 108 communicates unobstructedly with the bore 42, whereas the upper slot 112 has such a width as to snugly receive the reduced diameter nose portion 49 of the stop plug 48 (Figure 1) while leaving an axial portion thereof sufficient to permit free flow of fluid between the bore 42 and the passageway 102. By this construction, the nose portion 49 of the stop plug 48 prevents rotation of the stationary abutment stem 50 relatively to the cylinder head 12. The third passageway 104 at its rearward end communicates directly with the flared portion 74 of the passageway 72 in the stem 56 and thence with the threaded service port 76. For convenience of manufacture, the three passageways 100, 102 and 104 extend from end to end of the hollow stationary stem 50, the passageways 100 and 102 being closed at their rearward ends by plugs 114 (Figure 8) which have heads 116 of circular cross-section with axial projections 118 facilitating their being welded, brazed or otherwise secured in the rearward ends of the passageways 100 and 102 (Figures 1 and 3). The forward end of the passageway 104 is closed by a cylindrical plug 119 similarly secured therein.

The stationary abutment head 54 is peripherally grooved at 120 to receive a conventional O-ring 122 which is disposed in sealing engagement with the bore 124 within the tubular piston rod 126 of an outer tubular piston, generally designated 128, having a piston head 130 at its rearward end (Figure 1). The piston head 130 has a rearward surface 132 which is partly bevelled and partly radial adapted to engage the abutment surface 32. The piston head 130 is internally grooved as at 134 to receive a conventional O-ring 136 disposed in sealing engagement with the hollow stem 50 of the stationary abutment piston 52. The forward surface 138 of the piston head 130 is at the rearward end of the bore 124 and is opposed to the rearward abutment surface 140 on the rearward side of the stationary piston head 54, the forward side of which has an abutment surface 142. The rearward portion 141 of the tubular piston rod 126 is provided with external parallel flat portions 143 slidably engageable with the flat parallel guide surfaces 28 (Figure 4).

The forward portion 144 of the tubular piston rod 126 is reciprocably mounted within the cylinder bore 26 and is grooved annularly as at 146 to receive a conventional O-ring 148 (Figure 1) for sealing purposes. The forward piston rod portion 144 is provided internally with a bore 150 coaxial with the bores 26 and 124 but of slightly larger diameter than the bore 124 and joining the latter at an annular shoulder 152. Reciprocably mounted in the bore 150 is a floating piston head 154 with rearward and forward piston surfaces 156 and 158 respectively. The floating piston head 154 is annular grooved as at 160 to receive a conventional O-ring 162 for sealing purposes.

Projecting forwardly from the forward surface 158 of the piston head 154 is a reduced diameter portion 164 upon which are loosely mounted two pairs of oppositely-facing convexo-concave spring thrust washers 166, the forward pair of which engages the rearward face of a spacing washer 168 having a central hole 170 of slightly larger diameter than the reduced diameter portion 164 of the floating piston head 154. The spring thrust washers 166 are commonly known in the mechanical industries under the trade name of Belleville spring washers and spacing washers 168 of different thicknesses may be used with different numbers of spring thrust washers 166 according to the particular thrust desired to be exerted in the particular welding gun 10, according to the requirements of the particular installation. For the maximum desired thrust, the maximum number of spring washers 166 would be used in cooperation with a spacing washer 168 of minimum thickness, whereas for a lesser thrust a reduced number of spring washers 166 would be used with a spacing washer 168 of increased thickness to fill up the space left vacant by the lesser number of spring thrust washers 166.

The forward side of the spacing washer 168 engages the rearward end 170 of a plunger 172, the intermediate diameter portion 174 of which is reciprocably mounted in a hollow cylindrical bearing sleeve 176 mounted in the extreme forward end of the bore 150 of the forward portion 144 of the hollow piston rod 124, the bearing sleeve 176 and portion 144 being drilled in alignment to receive the opposite ends of a coupling pin 178, the intermediate portion of which passes through an axially-elongated slot 180 in the intermediate diameter portion 174 of the plunger 172, the forward portion of which is provided with a reduced diameter stem 182 having an outer cylindrical surface 184 for the purpose of holding a conventional welding electrode (not shown). The opposite sides of the plunger 172 are flattened as at 186 for the application of a wrench (not shown).

In the operation of the fixture-mounted spot welding gun 10, let it be assumed that the threaded service ports 44 and 76 are connected through a conventional hydraulic circuit and control valve to a hydraulic pump (not shown) which supplies hydraulic pressure fluid to the ports 44 and 76. Let it also be assumed that the conventional control valve is an electronically-operated control valve known to hydraulic and welding engineers and operative to rapidly reverse the flow of hydraulic working fluid or motive fluid to the gun 10 as much as several hundred times per minute, so as to impart a correspondingly rapid reciprocation to the plunger 172 and the electrode carried thereby. Let it also be assumed that the welding gun 10 has been mounted in a welding fixture by means of its threaded stem 62 in spaced relationship with other welding guns of the same type and similarly connected to the above-described hydraulic circuit. Such hydraulic circuits and their components are well-known to engineers skilled in the spot welding art and the details thereof are beyond the scope of the present invention.

As hydraulic pressure fluid is supplied alternately to the service ports 44 and 76 while fluid is alternately discharged from the service ports 76 and 44 respectively, the hydraulic pressure fluid passing alternately through the passageways 100, 102 and 104 acts alternately against the opposite sides of the piston heads 130 and 154, reciprocating them rapidly. Assuming that, for the particular instant, hydraulic pressure fluid is being supplied to the service port 44, this pressure fluid enters the passageways 100 and 102 to the forward side 142 of the stationary abutment piston head 54, acting against the rearward face 156 of the floating piston 154. At the same time, the pressure fluid entering the port 44 acts directly against the rearward surface 132 of the piston head 130, likewise forcing it forwardly to the right, thereby reciprocating the tubular piston 128 within the bore 26 of the cylinder 24, relative rotation therebetween being prevented by the engagement of the flat external and internal guide surfaces 143 and 28 respectively (Figure 4).

Meanwhile the fluid discharged from the space between the movable piston head 130 and the stationary abutment piston head 54 is discharged through the inclined port 110 and passageways 104 and 72 through the service port 76 into a pipe which carries it back through the hydraulic circuit to the suction side of the pump. Reversal of the control valve reverses the flow of hydraulic fluid just described, causing pressure fluid to be supplied to the forward side 138 of the movable piston head 130 through the service port 76, passageways 72 and 104 and port 110 while fluid is discharged from the space between the forward surface 142 of the fixed abutment piston head 54 and the rearward surface 156 of the floating piston head 154 through the passageways 100 and 102 and ports 108 and 112 into the bore 42 and thence through the service ports 44 into a pipe which returns it to the suction side of the pump.

The forward motion of the tubular piston 128 and of the floating piston head 154 through its connection therewith at the annular shoulder 152 simultaneously causes the coupling pin 178 to engage the forward end of the elongated slot 180 so as to move the plunger 172 and electrode carried by its stem 182 forwardly into engagement with the work while the floating piston head 154 compresses the spring thrust washers 166. The welding current is then caused to flow by the action of the conventional electric welding current supply circuit connected thereto, and spot welding takes place in the usual way with the metal of the workpiece being softened by the welding heat.

As this softening takes place, the relatively incompressible hydraulic working fluid, being a liquid, is incapable, in the infinitesimal time available, of following up the softening of the metal under the welding heat. The meanwhile-compressed thrust washers 166 now come into play to accomplish this followup action mechanically by the push which they exert through the spacing washer 168 against the rearward end 170 of the plunger 172, forcing it forwardly independently of the motion imparted to it by the coupling pin 178 and causing the stem 182 and welding electrode carried thereby to follow up the heat softening of the metal and continue the thrust upon the workpiece. In this manner, a follow-up action is provided which effectively clamps the sheet metal workpiece parts together at all times during the forward stroke of the welding gun 10, notwithstanding the softening of the metal of the workpiece parts by the heat developed during welding.

What I claim is:

A reciprocatory fluid motor comprising a cylinder having first and second fluid service ports and a generally cylindrical outer cylinder bore communicating with one of said ports, a hollow generally cylindrical outer piston reciprocably mounted in said outer bore, said outer piston having an apertured piston head disposed near the rearward end of said cylinder and a tubular piston rod extending forwardly from said head and having an inner bore therein, a stationary hollow stem mounted in the rearward end of said cylinder and projecting through the aperture in the outer piston head into said inner bore and terminating near the mid-portion of said outer cylinder, a stationary abutment head mounted on the inner end of said stem in engagement with said inner bore, said stem having first and second fluid passageway means extending therethrough to the forward and rearward sides respectively of said abutment head and communicating respectively with said first and second service ports, an inner piston having an inner piston head reciprocably mounted in said inner bore forwardly of said abutment head, a coupling device drivingly interconnecting said pistons, a power output member connected to one of said pistons, a resilient concave followup thrust washer disposed between said output member and said last-mentioned piston, and a lost-motion device comprising a pin-and-slot connection disposed between said outlet member and the other piston, said cylinder bore having a plurality of elongated longitudinally-extending substantially flat slide bearing surfaces and said outer hollow piston rod having a plurality of elongated longitudinally-extending substantially flat slide bearing surfaces cooperably engaging said substantially flat slide bearing surfaces of said cylinder bore whereby to prevent relative rotation therebetween, said first fluid passageway means including a plurality of fluid passageways spaced transversely apart from one another and from said second fluid passageway means and extending through said stem to the forward side of said abutment head.

References Cited in the file of this patent

UNITED STATES PATENTS

| 747,772 | Rickman | Dec. 22, 1903 |
| 1,552,768 | Smith | Sept. 8, 1925 |
| 1,877,102 | Whitesell | Sept. 13, 1932 |
| 2,457,606 | Senn | Dec. 28, 1948 |
| 2,460,759 | Martin | Feb. 1, 1949 |
| 2,468,943 | Parsons | May 3, 1949 |
| 2,642,138 | Macewka | June 16, 1953 |
| 2,661,599 | Folmer | Dec. 8, 1953 |
| 2,714,150 | Kaiser | July 26, 1955 |
| 2,839,665 | Wolfbauer | June 17, 1958 |